Figure 1:
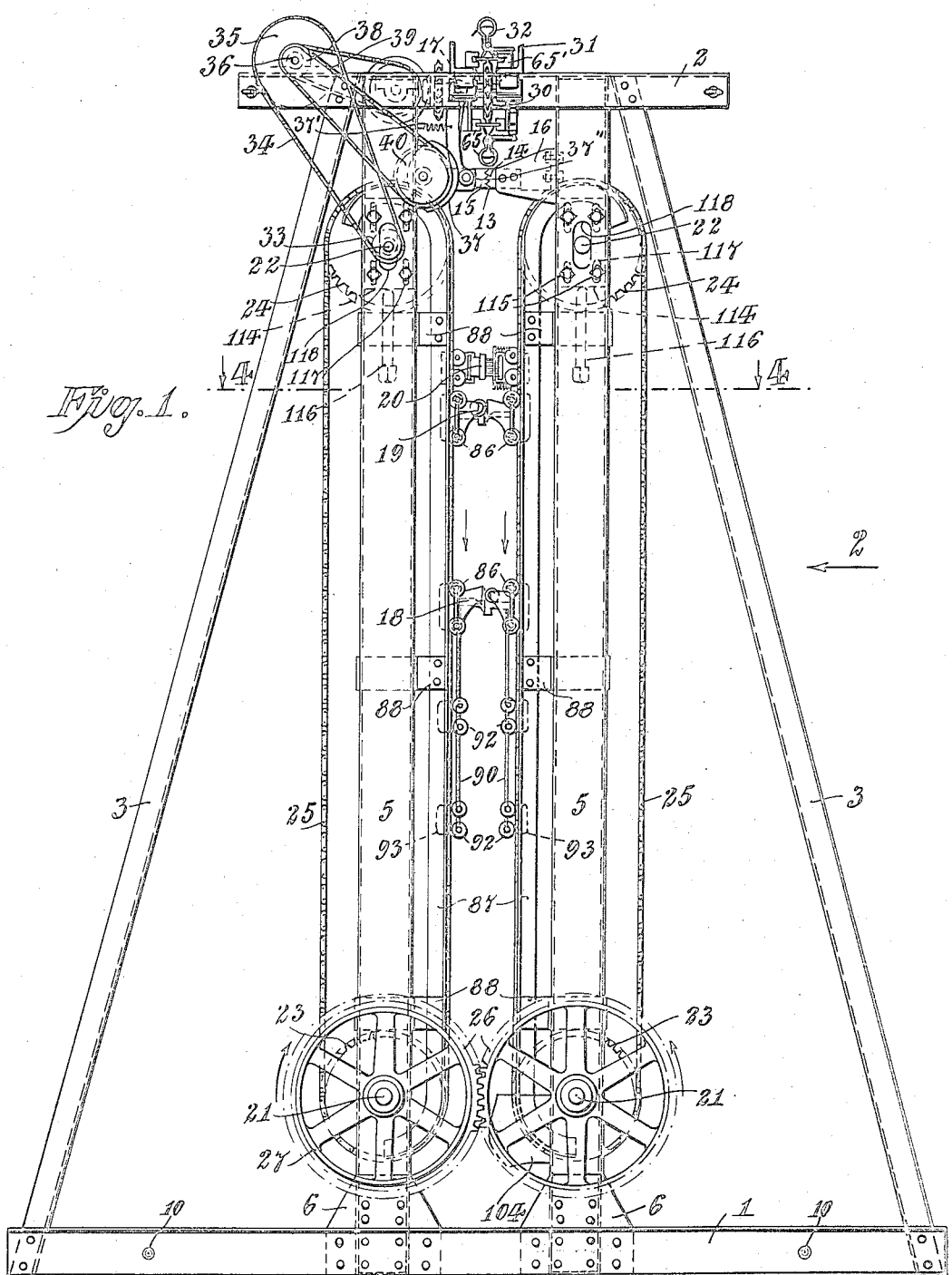

W. S. GROVE.
PULP AND WASTE REMOVING AND FIBER CLEANING MACHINE.
APPLICATION FILED JAN. 19, 1914.

1,145,015.

Patented July 6, 1915.
6 SHEETS—SHEET 1.

WITNESSES

INVENTOR
Winfield S. Grove
BY
HIS ATTORNEYS

W. S. GROVE.
PULP AND WASTE REMOVING AND FIBER CLEANING MACHINE.
APPLICATION FILED JAN. 19, 1914.

1,145,015.

Patented July 6, 1915.
6 SHEETS—SHEET 2.

WITNESSES

INVENTOR
Winfield S. Grove
BY
HIS ATTORNEYS

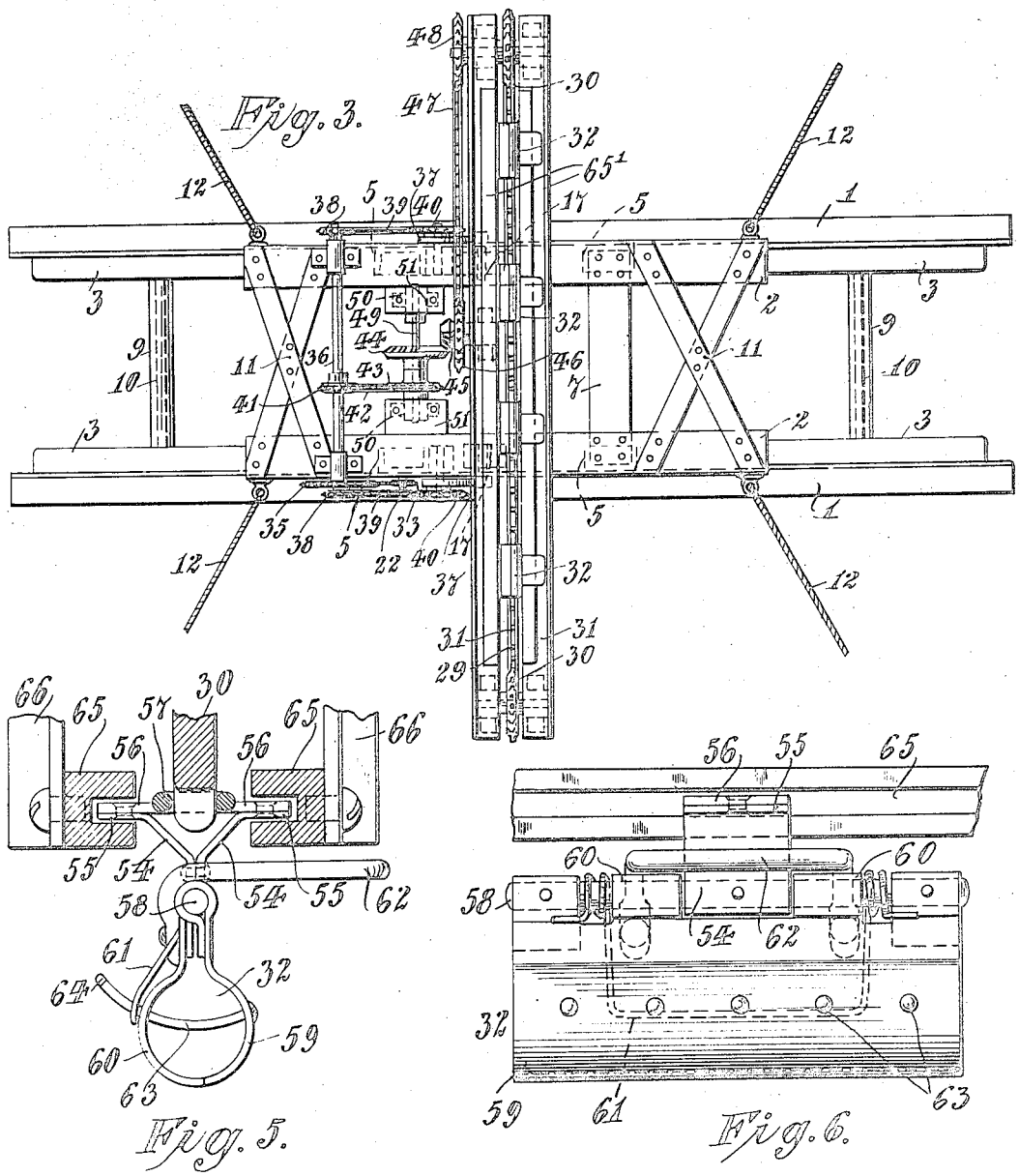

W. S. GROVE.
PULP AND WASTE REMOVING AND FIBER CLEANING MACHINE.
APPLICATION FILED JAN. 19, 1914.
1,145,015.
Patented July 6, 1915.
6 SHEETS—SHEET 4.
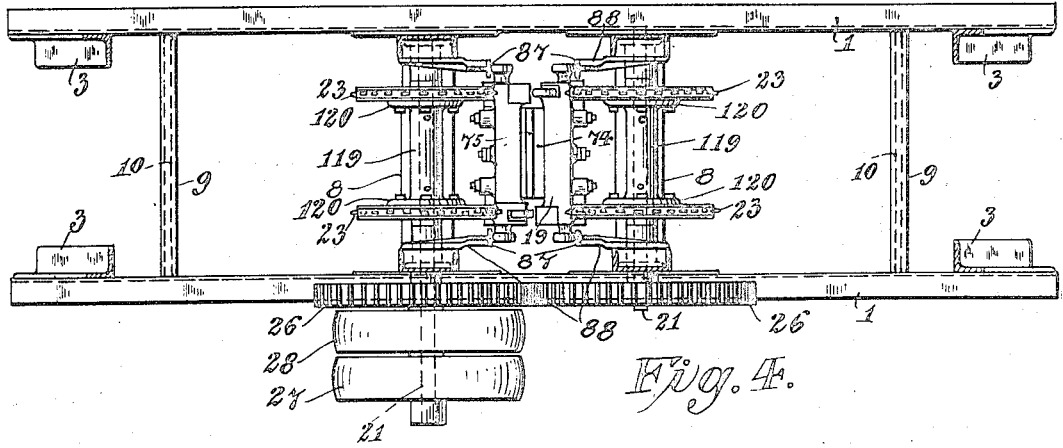
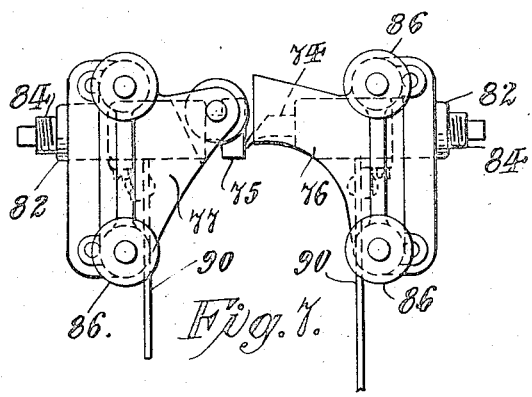
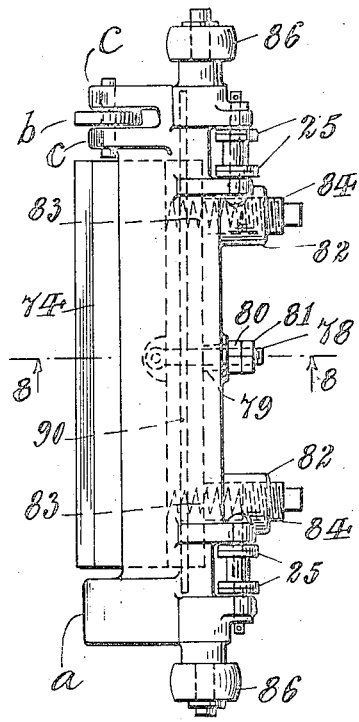
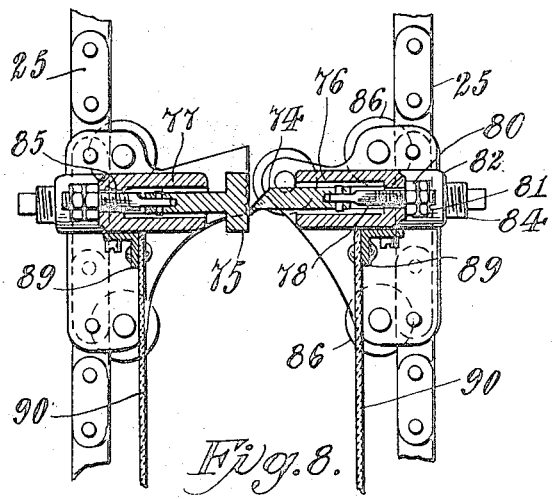
WITNESSES
INVENTOR
BY
HIS ATTORNEYS

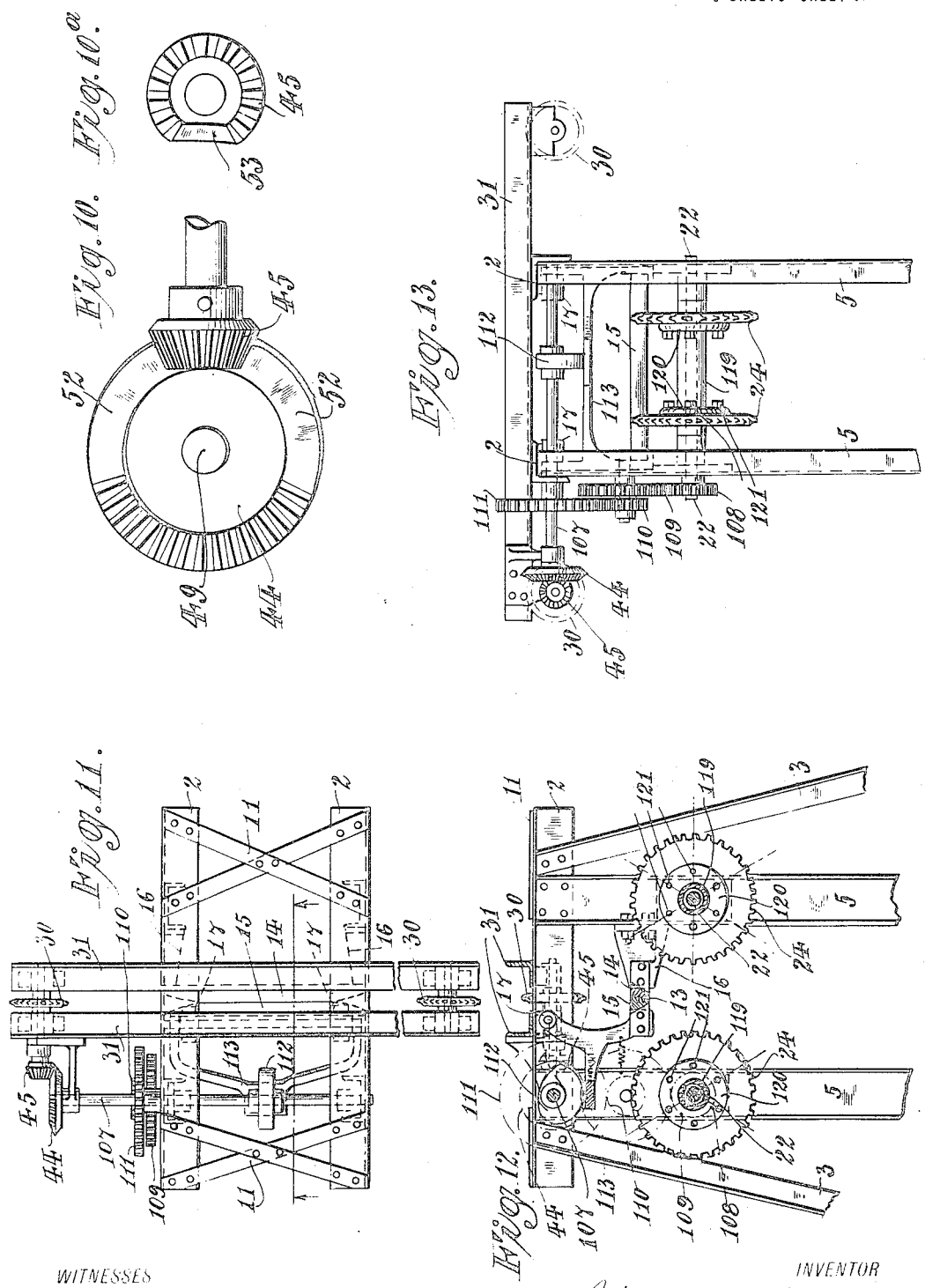

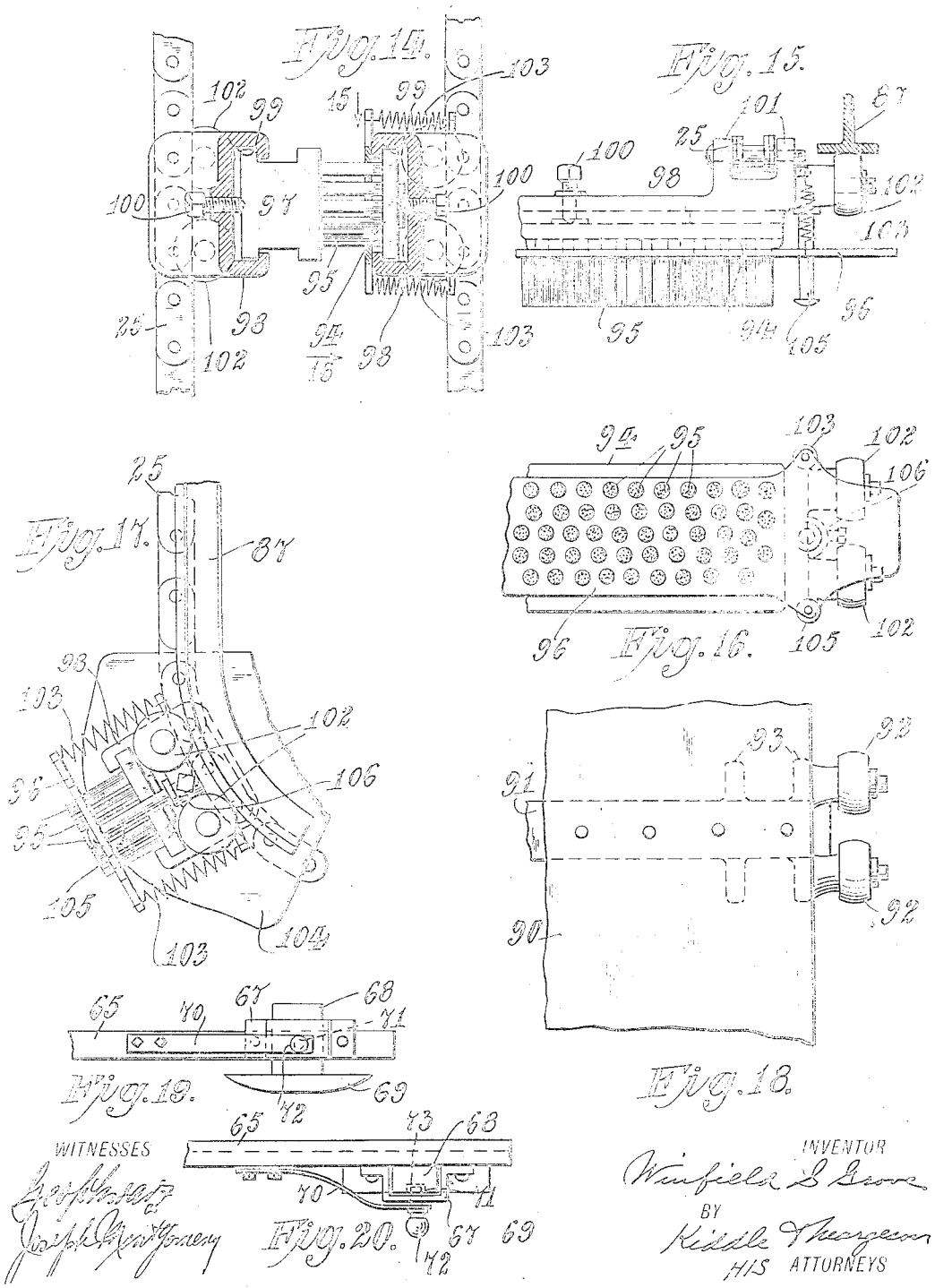

UNITED STATES PATENT OFFICE.

WINFIELD S. GROVE, OF MANILA, PHILIPPINE ISLANDS.

PULP AND WASTE REMOVING AND FIBER-CLEANING MACHINE.

1,145,015.  Specification of Letters Patent.  Patented July 6, 1915.

Application filed January 19, 1914. Serial No. 813,051.

*To all whom it may concern:*

Be it known that I, WINFIELD S. GROVE, a citizen of the United States, residing in the city of Manila, Philippine Islands, have invented certain new and useful Improvements in Pulp and Waste Removing and Fiber-Cleaning Machines, of which the following is a specification.

The object of the invention is to provide a machine for removing pulp and waste materials from a fibrous vegetable substance and for cleaning the fibers of the substance. In other words, the invention is directed to a machine for isolating the fibers in a leaf or strip from the rest of the material in the leaf or strip. A machine which is particularly adaptable for obtaining manila hemp fiber from the original leaves or strips, may also be utilized for treating other fibrous substances such as sisal, maguey, pineapple leaves, or the like.

In the construction of a machine for the cleaning of hemp fiber or the like, it is advisable that the machine be made: (*a*) Light and at the same time capable of withstanding the comparatively heavy strains which are incidental to the pulp and waste removing and the fiber cleaning operation; (*b*) so that the pulp and waste incident to said pulp and waste removing operation will drop out of or be removed from the machine before the removed pulp and waste has a chance to collect or interfere with the machine or otherwise hinder the proper working of its various parts: (*c*) so that the fibrous portions of the substance, at the end of the pulp and waste removing and fiber cleaning operations, will be comparatively dry and free of pulp, water and acids which may have formed a part of or which may have been in the substance at the time of the commencement of the operation; and (*d*) so that the machine can, to a certain extent, be comparatively easily transported from one field of operation to another, and so that the stock, be it fibrous leaves or other work pieces, which is being treated can be readily inserted in the machine, and readily removed from the machine, without liability of injuring the operator. Such a machine has been made the basis of a pending application, Serial No. 799,864, filed by me in the United States Patent Office on November 8th, 1913.
The machine which is made the basis of the present application also embodies all of the above characteristics. In the last mentioned machine, however, a certain automaticity of the various operating parts has been provided which was not included in the machine shown in the application above referred to.

In the machine shown in the present application there is also embodied several improvements in the various parts which will hereinafter be described and pointed out.

The present application is to be considered in many respects a continuation of my former application above identified.

Reference is now made to the drawings which constitute a part of the present application. On these drawings there is clearly illustrated a machine which has been actually built and operated by me prior to the time of my executing this application.

Figure 2:
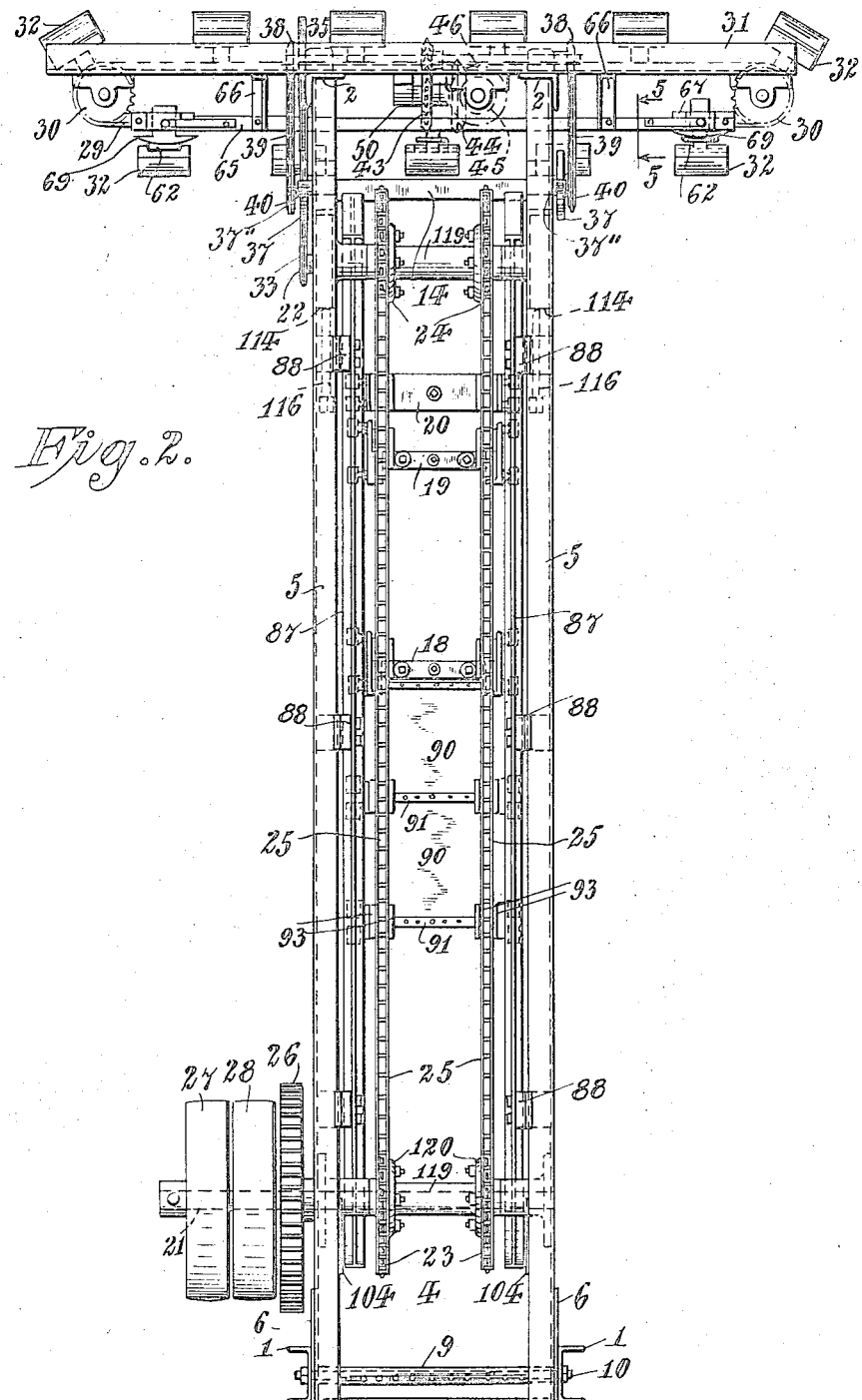

In the drawings: Figure 1 is an elevation of the delivery end of the machine. Fig. 2 is a side elevation of the machine shown in Fig. 1 and is a view looking in the direction of the arrow 2 shown in said Fig. 1. Fig. 3 is a plan view of the top of the machine, showing principally the mechanism for feeding the work pieces or stock to the machine and the mechanism for automatically operating the feeding mechanism. Fig. 4 is a horizontal sectional view taken as on the line 4—4 of Fig. 1. Fig. 5 is a sectional view taken as on the line 5—5 of Fig. 2. This view shows in end elevation the clamps of the feeding mechanism and the ways for guiding and holding the clamps, the sprocket of the feeding mechanism being indicated by dotted lines. Fig. 6 is a side elevation of the clamp shown in Fig. 5 and also a portion of one of the guideways or holding members for the clamp. Fig. 7 is an end elevation of a pair of opposing stock engaging members, frequently referred to hereinafter as work engaging members, and the carriages therefor. In this figure there is also indicated the depending aprons for protecting the carriage propelling mechanism while the pulp and waste is being removed from the fibers in the substance being treated. Fig. 8 is a view, partially in section, of the opposing stock engaging members, constituting a set of decorticating tools or members, the oppositely disposed carriages supporting said stock engaging members, a portion of the aprons and a portion of the chains for propelling said carriages whereby said stock engaging members will be moved along the work piece or stock. Fig. 9 is a plan view of one of the stock engaging members and its carriage. Fig. 10 is a view of an intermittent gearing which is included as a part of the mechanism that operates the feeding mechanism whereby an intermittent movement can be imparted to the latter. Fig. 10ᵃ is an end view of the small gear of the intermittent gearing. Figs. 11, 12 and 13 illustrate a modified form of the mechanism, wherein spur gears are used instead of chains and sprockets, for automatically operating the feeding mechanism and the stock holding mechanism; Fig. 11 being a plan view, Fig. 12 being a vertical sectional view, and Fig. 13 being a side view. Fig. 14 is a view, partially in sections, showing opposing stock engaging members, one of which is a brush and the other a block, carriages therefor, portions of propelling chains to which the carriages are secured, and a perforated plate for cleaning the brush. Fig. 15 is a view of a portion of the brush and perforated plate; this is a view looking in the direction of the arrow 15 shown in Fig. 14. Fig. 16 is a view of a portion of the brush and plate looking in the direction of the arrow 16 shown in Fig. 14. Fig. 17 is a view showing the perforated plate moved toward the free end of the bristles or brushing members; this figure also shows the cam or trip for moving the perforated plate toward the free ends of the bristles. Fig. 18 is a view of a portion of the apron and the cross member of the car to which the same is secured. Fig. 19 is a side view of the trip or cam mechanism for opening the clamping jaws of the feeding mechanism. Fig. 20 is a plan view of the same.

The machine comprises a main frame, mechanism for holding the work-piece or stock while it is being operated upon, mechanism (hereinafter referred to as stock engaging mechanism or work engaging mechanism, namely 18, 19 and 20) for engaging and operating upon opposite sides of the work piece or stock while the latter is held in depending position by the holding mechanism, mechanism for feeding the work piece or stock in position where it can be held by the holding mechanism and for conveying the work piece or stock from the holding mechanism after the work piece or stock has been operated upon, and an intermediate mechanism arbitrarily so-called because it is located intermediate of and is common to the mechanisms hereinafter referred to coöperatively related to the stock engaging mechanism, the stock holding mechanism and the feeding mechanism, whereby the stock feeding mechanism and the stock holding mechanism will operate in certain timed relationship with respect to the stock engaging mechanism.

The main frame of the machine comprises the lower horizontally and transversely extending base members 1, the upper horizontally and transversely extending cap members 2, and the inclined lateral braces 3. The frame also comprises four upright members 5 arranged in pairs at opposite sides of the machine. The upright members 5 are often referred to as the main upright members. These uprights are secured at the top directly to the transversely extending cap members 2, and at the bottom by means of bolts and gusset plates 6 to the transversely extending base members 1. The uprights at one side of the machine are also connected together at their top portions by means of the longitudinally extending spacing member 7. The uprights in each pair are connected together at their bottom portions by the longitudinally extending spacing members 8. At the lower portion of the frame there is also provided a plurality of spacing tubes 9 and a plurality of bolts 10 for assisting in retaining the transversely extending base members 1 in the proper position relative to each other.

At the top of the machine there is provided bracing 11 which extends between the transversely extending cap members 2. The function of this bracing is not only to retain the transversely extending cap members 2 from moving relative to each other, but also to serve as means for properly spacing said members so that all of the uprights 5 will be properly positioned relative to each other.

To retain the machine rigid and erect when in the field, guy ropes or cables 12 may be employed which are connected as by means of eye bolts at or adjacent to the extremities of the transversely extending cap members 2.

The stock holding mechanism is indicated by 13. This mechanism grips the upper end of the stock, which is a fibrous substance while the latter is depending from the grippers or clamps of the feeding mechanism and holds said stock during its treatment by and between the downwardly-moving opposing stock-engaging tools or members which are subsequently to be described more in detail. This stock piece holding mechanism may be termed the fixed gripping mechanism and it comprises the fixed jaw 14 and a companion pivoted jaw 15. Each of these jaws extend substantially the full length of the machine. The fixed jaw 14 is held in place by the brackets 16 which are secured to the main frame uprights 5 that constitute the pair of uprights at one side of the machine. The pivoted jaw 15 is carried by a pair of bearings 17 which are secured to the transversely extending cap members 2.

The stock engaging mechanism comprises opposing decorticating members carried in oppositely disposed carriages. There may be several sets of opposing stock engaging members and in Fig. 1 the sets are numbered as 18, 19 and 20, and they are arranged to engage the work piece or stock in the order enumerated. The construction and arrangement of these sets will be subsequently described, but it will be here remarked that the number and class of opposing stock-engaging members for operating upon the stock may be varied as the number and class are dependent upon the grade of finish desired to be imparted to the cleaned fibers. The decorticating members just referred to are in the sets of members 18 and 19 and said decorticating members are shown in Figs. 7, 8 and 9 of the drawings.

There is secured to the uprights 5 suitable bearings for carrying the shafts 21 and 22, upon which are respectively mounted the sprockets 23 and 24. The endless roller chains 25 engage said sprockets and serve as means for propelling the opposing stock engaging members downwardly along the stock when the latter is held by the stock holding mechanism 13.

The shafts 21, which are located in the bearings at the lower portion of the main upright members 5, are operatively connected together as by the spur gears 26 and one of these shafts is provided with a suitable means for operating the machine, as for example the tight driving pulley 27 and the loose pulley 28.

The feeding mechanism comprises the endless chain 29 which runs over the sprockets 30 that are carried by shafts that are mounted in bearings which are secured in place on the ends of the longitudinally extending angle irons 31 located at the top of the machine. These angle irons 31 are secured to the transversely extending cap members 2.

A number of equally spaced spring pressed clamps or carrying grippers 32 are connected to the endless chain 29. The function of these clamps is to engage the stock when inserted in place therein by the operator and grip it with sufficient force so that the stock will be conveyed in the proper position for it to be seized by the stock holding mechanism and held by the latter while being operated upon. The feeding mechanism also conveys the stock from said holding mechanism after the stock has been operated upon. The construction of these clamps will subsequently be described more in detail and they are clearly shown in Figs. 5 and 6.

One of the shafts 22 (see shaft at upper left hand portion of Fig. 1) has secured thereto a sprocket 33 which by means of the chain 34 and the sprocket 35 operates a shaft 36 that in turn operates the mechanism for opening and closing the jaws of the stock holding mechanism and also for imparting an intermittent movement to the endless chain of the stock feeding mechanism.

The movable jaw 15 of the stock holding mechanism is closed, by the cams 37, on the stock prior to the stock engaging members starting on their downward travel and is opened by the tension springs 37' after the last set of stock engaging members have performed their operation upon the work piece or stock. The springs are enabled to retract the pivoted jaw at this time by reason of the depressions in the cams which are then adjacent to the rollers 37'', on said jaw, which are engaged by the cams. The cams 37 are operated from the shaft 36 by means of the sprockets 38, the chains 39 and the sprockets 40.

The intermittent movement to the stock feeding mechanism is obtained by means of an intermediate mechanism, that is specifically a chain and gear mechanism comprising the following members which, it will be noted, includes the intermittent gear illustrated more clearly in Fig. 10 and Fig. 10$^a$, namely, the sprocket 41, the chain 42, the sprocket 43, the intermittent gears 44 and 45, the sprockets 46, the chain 47 and the sprocket 48. The sprockets 43 and one of the intermittent gears, viz., the large gear 44, are both carried on a shaft 49 that is mounted in bearings 50 supported on plates or brackets 51 which are secured to the transversely extending cap members 12.

In the intermittent gearing illustrated in Figs. 10 and 10$^a$ the large gear 44 is provided with the elevated portion 52 whose general surface is at the proper elevation to fit the dwell or concave portion 53 of the small gear 45 whereby the small gear 45 and the feeding mechanism operated thereby will stop for a period and be locked against movement while the large gear 44 continues its rotation.

The carrying grippers which are connected to the endless chain of the feeding mechanism are clearly shown in Figs. 5 and 6. Each of these carrying grippers is provided with a pair of yokes 54 having ears 55 which are connected to ears 56 that are integral with the chain link 57. Each of the grippers is also provided with a hinge pin 58 which is pinned or riveted to the yoke 54. There is also pinned or riveted to the hinge pin 58 one of the leaves or jaws 59 of the clamp while the other leaf or jaw 60 of the clamp can be swung on the pin whereby the jaws can be separated from each other. These jaws are normally forced toward each other by the spring 61. The clamps, however, can be opened by pulling down on the lever 62, thus forcing the jaw 60 outwardly against the pressure of the spring 61. The movement of this jaw 60 is limited by the stop rods 63 which are positioned so as to limit the distance which the material to be operated upon can be inserted in the clamps or grippers. These members 63 serve as stops due to the enlargements or nubbins 64 which engage the outer portion of the leaf or jaw 60.

In order to guide the clamps and also in order to hold them so that they will not swing about the chain as a center when the jaws are being opened by means of the levers 62, a pair of guiding and holding strips 65 are provided on opposite sides of the lower line of the chain. These guiding and holding strips are provided with grooved portions which receive the ears 55 and 56 that are respectively on the yokes of the grippers and the links of the chain. These ears slide along these grooved portions thus permitting the members 65 to operate not only as holding members but also as guides for the carrying grippers while they are moving the stock toward and from the position where it is operated upon.

The guiding and holding members 65 are supported by the depending angle irons 66 fastened to the longitudinally extending angle irons 31 of the feeding mechanism. These angle irons 66 are indicated not only in Fig. 5 but are also clearly shown in Figs. 1 and 2.

A pair of guiding members 65' are located on the opposite sides of the upper line of endless feeding chain. These guiding members 65' are secured to the longitudinally extending angle irons 31 and are provided with grooved portions along which the ears 55 and 56 travel. The members 65' thus guide and hold the clamps in inverted position when the latter are being returned to the entering end portion of the machine.

Two sets of tripping mechanisms for automatically opening the grippers as they are about to begin their travel toward the stock holding mechanism and when they are near the end of their travel from the stock holding mechanism are indicated as being carried at or near the ends of one of the guide members 65. These tripping mechanisms are each numbered 67 and are shown more in detail in Figs. 19 and 20. A description of one of these tripping mechanisms will suffice for both. In said Figs. 19 and 20 a portion of the guiding member 65 is shown and to the vertical exterior face of this member there is secured the yoke or strap 67 which receives the vertically movable cam member 68 having the cam portion 69 arranged so that when the cam member is locked in its lowest position by the spring 70 carrying the locking pin or bolt 71, the cam will be in the path of the levers or handles 62 of the carrying grippers whereby as said levers or handles move along in engagement with said cam portion 69 the carrying jaws will be automatically opened.

It will be noted at this point that the feeding mechanism is so timed that when the intermittent gearing causes the feeding mechanism to be stopped, the handles of the gripper will be located directly below and in engagement with said cam 69. It will also be observed that one of the grippers will be located in the proper position to support the work piece or stock where it can be engaged and held by the stock holding mechanism.

After the stock has been placed between the jaws of a gripper which is just about to begin its travel toward the operative portion of the machine, the spring 70 is retracted, as by pulling on the head 72 of the locking pin or bolt 71, in order to disengage the same from the slot or depression 73 in movable cam member. This permits the latter to be forced upwardly due to the pressure imparted to the lever or handle 62 by the spring 61 and allows the clamp to seize the stock. The weight of the cam member is sufficient to restore the cam member to normal position with the locking pin 71 in the slot 73 when the lever or handle 62 moves from engagement with the cam, or in other words, when the lever moves off from the trip.

The tripping mechanism at the delivery end of the machine is the same as that at the entering end of the machine, but it is unlikely that the releasing mechanism comprising the spring 70 will be utilized to any great extent to release the cam member.

In respect to the stock holding mechanism comprising the fixed and pivoted clamping jaws 14 and 15, it will be noted that the cams 37 for operating the pivoted jaw will make one complete revolution for each complete revolution of the sets of stock engaging members attached to the chains 25, and that these cams are constructed so as to hold the jaws in clamping position for a short period prior to the stock engaging members starting on their downward operative travel, during said downward travel, and for a short period after the last of said stock engaging members have left their operative engagement with the work piece or stock, and that the cam is constructed so as to permit the jaws of the stock holding mechanism to be open during a large part of the return travel of the stock engaging members. The latter affords time for one carrying gripper to move a new piece of stock in operative position where it can be engaged and held by the holding gripper while another carrying gripper is removing a piece of stock which has just been operated upon from between the holding grippers of the machine.

The intermittent gearing for operating the feeding mechanism is connected to the mechanism for propelling the stock engaging members downwardly along the stock in such manner that the large gear 44 and the small gear 45 each make one revolution for a complete cycle or revolution of the stock engaging members.

The gearing between the small intermittent gear and the endless chain of the feeding mechanism is such that the endless chain is moved the distance between the centers of adjacent carrying grippers for each revolution of the small gear.

The opposing stock engaging or decorticating members shown in Figs. 7, 8 and 9 comprise a knife 74 and a resisting member or block 75. The shape of the stock engaging portion of this knife and the stock engaging portion of the opposing resisting member is the same as that of the knife and the resisting member shown and described in my pending application previously referred to.

Substantially the same knife and resisting member is used in each of the sets designated as 18 and 19 in Fig. 1. When in place these knives are arranged so that the knife in set 18 engages the pulp side of the stock while the knife in the set 19 engages the opposite smooth or glossy side of the stock.

The knife which is designated as 74 in Fig. 8 is slidably mounted in the carriage 76, and the resisting member 75 is slidably mounted in the carriage 77. The knife 74 has pivotally connected thereto the eye bolt 78 that passes through an opening 79 to the rear portion of the carriage. On the rear end of this bolt are mounted two nuts, one 80 serving to limit the extreme inward position of the knife, while the nut 81 serves as a locking nut for the nut 80.

The carriage 76 is provided with a pair of bosses or projections 82 which are hollowed out to receive the compression springs 83 that engage the rear portion of the knife 74 and tend to force it forwardly against the stock. The degree with which these springs press against the stock is controlled to a certain extent by the adjusting plugs 84 that are threaded into the projection 82.

The resisting member 75 is limited in its forward movement against the stock by the eye bolt 85 and nuts thereupon that are substantially the same in construction as the eye bolt 78 and nuts 80 and 81. The resisting member 75 is also forced forwardly against the stock by compression springs which are mounted in the carriage the same as the compression springs 83 shown in Fig. 9.

Both the carriages 76 and 77 are provided with supporting wheels 86 that travel along the guides 87 of T cross section. These guides 87 are located in the space between the pairs of vertical uprights 5—5 and are secured to the latter by the connecting brackets 88.

In order to retain the carriages against their respective tracks during the downward travel of the carriages, they are preferably each provided at one end with a projection $a$ and at the other end with the roller $b$ located between the projecting ears $c$. When the carriages move downwardly the roller $b$ of one carriage is located opposite the projection $a$ of the other carriage.

The carriages for the sets of stock opposing engaging members 18 and opposing set of stock engaging members 19 are substantially the same as those just described. The carriages for the lower set 18 however are preferably provided with angle irons 89 that extend the full length of the carriages. To these angle irons there are secured the upper ends of the aprons 90. These aprons are also connected to the cross bars 91 that extend lengthwise of the machine and which bars are provided at the opposite ends thereof with the rollers 92 that travel along the T guides 87 at opposite ends of the machine. These bars 91 are also connected to the links of the chains 25 by the lugs 93. (See Fig. 18.)

In Figs. 14 to 17 there is illustrated a self-cleaning brush. This brush is opposed by a comparatively flat stock engaging or resisting member and this brush and the resisting member are preferably constructed interchangeable. The self-cleaning brush is designated by the reference character 94 and comprises the brush member proper 95 and the movable perforated plate 96 which is movable outwardly from the back of the brush toward the ends of the bristles or brushing member 95 to clean the brush after the same has operated upon the stock. The resisting member is designated as 97.

A pair of carriages 98 of similar construction are secured to the chains 25 and receive in the slotted portions 99 thereof the back of the brush 95 and the back of the brush resisting member 97. A set screw 100 is provided in each of the carriages for retaining the brush or the resisting member, as the case may be, in place in the carriage. Each of the carriages is also provided with lugs 101 for attaching the carriage to the chains 25 and also with rollers 102 which engage the guides 87.

The perforated plate 96 is held in retracted position adjacent to the back of the brush by the tension springs 103 but this plate can be forced from the back of the brushes by the cams or trips 104 which are secured to the uprights 5. This perforated plate is guided during its movement relative to the back of the brush by the pins 105 that are carried in sockets 106 located at each end of the carriage.

A modified form of mechanism for operating the feeding mechanism and the stock holding mechanism from one of the shafts of the mechanism for propelling the stock engaging members along the stock is illustrated in Figs. 11 to 13. In these figures the sprockets for carrying the endless chain of the feeding mechanism is designated by 30, and these sprockets are secured to the shafts which are mounted in the bearings that are on the angles 31. A pair of intermittent gears, the same as shown in Figs. 10 and 10ª, are utilized in this construction and designated 44 and 45 in Fig. 11. The small gear 45 is directly connected to one of the shafts carrying one of the sprockets 30 while the other of the gears, namely 44, is directly connected to the shaft 107 which is driven from one of the shafts 22 by means of the train of spur gearing comprising the gears 108, 109, 110 and 111. This shaft 107 also has secured thereto the cam 112 which operates the pivoted jaw 15 of the stock holding mechanism 13 by engagement with the arm 113 which is on said pivoted jaw. The operation, however, of the stock feeding mechanism and stock holding mechanism in the construction just described is substantially the same as the stock feeding mechanism and the stock holding mechanism shown in Figs. 1 and 2.

In my previous application, above identified, what I termed therein jockey sprockets were utilized to take care of any slack which developed in the endless chain 25 due to wear or otherwise. In the construction shown in Fig. 1 the jockey sprockets have been dispensed with and instead thereof I have provided movable bearings 114 for the shafts 22. These movable bearings 114 can be raised or lowered by the loosening of the nuts 115 and by the turning of the bolts 116 that are located in nuts which are secured to the upper set of brackets 88. The movement of these bearings 114 is permitted due to the elongated bolt receiving slots 117 and the elongated slots 118 into which the shafts 22 extend. In case the gearing construction shown in Figs. 11 to 13 is utilized, then it will be advisable to have the movable bearings located at the bottom of the machine if no jockey sprockets be used.

In order to properly space and position the sprocket wheels 24 relative to each other and to maintain them in relationship, spools 119 have been provided with flanges 120 at each end. These spools are secured in any suitable manner as by pins or keys to the shafts upon which they are located, and the sprockets 24 are secured to the spools by means of bolts 121 which pass through the central portions of the sprockets and the flanges of the spools. The sprockets preferably have a number of teeth which are a multiple of the number of bolts that secure the sprockets to the spools and the spacing of the bolt holes in the flanges and also in the sprockets are equal. The bolt holes in the sprockets are also placed in a true radial line with the center of the teeth or else with the space between the teeth so that no matter in which way the sprockets are secured to the spools they will always be correct or so that the sprockets on all spools will be in harmony and accord with each other.

The improvements herein set forth are not limited to the precise construction and arrangement shown and described as they may be embodied in various forms and modifications without departing from the spirit and scope of the invention.

I claim as my invention:

1. A fiber isolating machine comprising a main frame, a stock holding gripper supported on the upper portion of the frame, stock feeding mechanism comprising stock carrying grippers that travel above the jaws of the holding gripper, mechanism comprising decorticating members which engage opposite sides of the stock when it is held in depending position by the holding gripper and at a time when said members are being moved downwardly away from the holding gripper, and mechanism operatively connecting the mechanism which comprises the opposing decorticating members, the holding gripper and the stock feeding mechanism so that prior to the opposing decorticating members being in position to operate upon the stock the feeding mechanism will convey stock between the jaws of the holding gripper and will allow the feeding mechanism to stop prior to the holding gripper being closed and to remain stopped until the opposing decorticating members have operated upon the stock.

2. A fiber isolating machine comprising in combination a stock holding gripper, feeding mechanism comprising a series of carrying grippers for conveying stock to and from the holding gripper, and mechanism comprising opposing decorticating members which travel away from the stock holding gripper when said members are in engagement with the stock being held by the holding gripper, and an intermediate mechanism between the stock holding gripper and the feeding mechanism, said intermediate mechanism being constructed and arranged so that the stock holding gripper will be intermittently opened and closed and so that the feeding mechanism will intermittently move the carrying grippers along, whereby when the stock holding gripper is open the feeding mechanism will operate to position stock, which is in a carrying gripper, between the jaws of the work holding gripper.

3. In a machine of the class described, the combination of a main frame supporting thereupon feeding mechanism comprising an endless chain having secured thereto a series of carrying grippers which are moved longitudinally of the machine, a stock holding mechanism having jaws arranged to receive between them the stock when fed longitudinally of the machine by the feed-